United States Patent [19]

Sattlegger et al.

[11] 4,434,283
[45] Feb. 28, 1984

[54] POLYSILOXANE MOLDING COMPOSITIONS

[75] Inventors: Hans Sattlegger, Odenthal; Karl Schnurrbusch, Leverkusen; Bruno Degen, Bergisch-Gladbach; Theo Achtenberg, Leverkusen, all of Fed. Rep. of Germany

[73] Assignee: Bayer Aktiengesellschaft, Leverkusen, Fed. Rep. of Germany

[21] Appl. No.: 346,810

[22] Filed: Feb. 8, 1982

Related U.S. Application Data

[63] Continuation of Ser. No. 165,573, Jul. 2, 1980, abandoned.

[30] Foreign Application Priority Data

Jul. 21, 1979 [DE] Fed. Rep. of Germany ....... 2929635

[51] Int. Cl.$^3$ ............................................ C08G 77/04
[52] U.S. Cl. ...................................... 528/34; 524/425; 524/863; 528/18; 528/33
[58] Field of Search .............................. 528/33, 34, 18; 524/863, 425

[56] References Cited

U.S. PATENT DOCUMENTS 3,364,160 1/1968 Golitz et al. ........................... 260/18
3,689,454 9/1972 Smith et al. ........................... 60/46.5
3,719,634 3/1973 Clark et al. ......................... 260/46.5
3,847,848 11/1974 Beers ..................................... 260/18
3,888,815 6/1975 Bessmer et al. ....................... 528/33

Primary Examiner—Melvyn I. Marquis
Attorney, Agent, or Firm—Sprung, Horn, Kramer & Woods

[57] ABSTRACT

In a polysiloxane molding composition which in the presence of water crosslinks to an elastomer and which comprises
  (A) an α,ω-dihydroxyorganopolysiloxane with a viscosity of about 500 to 2,000,000 cP,
  (B) a crosslinking agent, and
  (C) a reinforcing filler, the improvement which comprises including therein in about 0.1 to 10% by weight a silicon compound containing at least 3 alkoxy groups and preferably of the formula $$R_n Si(Alkoxy)_{4-n}$$

in which
  R is alkyl with 1 to 10 carbon atoms,
  Alkoxy has 1 to 4 carbon atoms, and
  n is 0 or 1, whereby the elastomer ultimately produced exhibits improved direct adhesion to various substrates.

3 Claims, No Drawings

POLYSILOXANE MOLDING COMPOSITIONS

This is a continuation of application Ser. No. 165,573, filed July 2, 1980, and now abandoned.

The present invention relates to improved organopolysiloxane molding compositions, which are improved, in particular, with respect of their adhesion to the most diverse substrates.

Ready-to-use pastes based on organopolysiloxanes have found an extensive field of application as sealing substances for joints. Such pastes and the elastomeric shaped articles obtained therefrom by crosslinking, with the absorption of atmospheric moisture, represent an ideal sealing substance for the most diverse purposes. Classical representatives of such so-called one-component systems are described, for example, in French Patent Specification No. 1,188,495, German Patent Specification No. 1,247,646 or W. Noll, Chemistry and Technology of Silicones, 1968, Academic Press, New York and London, Chapter 8.1.2.3.2, pages 398 and 399.

The adhesion to the most diverse substrates is a problem of the known one-component systems which has not yet been solved completely. In many cases, this adhesion leaves something to be desired in individual systems, or substances must be added which in turn have an adverse effect on the system in other respects, in that they discolor the compositions, are physiologically unacceptable or change the crosslinking properties or storage stability in an adverse manner.

Surprisingly, it has now been found that a very good adhesion can be achieved by adding extremely effective substances in small amounts without these substances impairing the storage stability, ease of crosslinking or processability. In many cases, surprisingly, the storage stability is even improved.

The present invention thus relates to polysiloxane molding compositions which can be stored with exclusion of moisture and which crosslink after water or steam is supplied to form elastomers, and which consist essentially of (A) an $\alpha,\omega$-dihydroxyorganopolysiloxane with a viscosity of about 500 to 2,000,000 cP (20° C.), (B) a substance which has a crosslinking effect, (C) a filler which has a reinforcing effect and (D) if appropriate, a curing catalyst, and which are characterized in that they also additionally contain (E) about 0.1 to 10% by weight, relative to the total composition, of a silicon compound containing at least 3 alkoxy groups.

Examples of such silicon compounds are those of the following general formula

R can be an alkyl radical with 1–10 C atoms with 1–4 C atoms or a hydrogen atom. The alkoxy radical has 1–4 C atoms and n is 0 or 1.

These additives are particularly advantageous in the case of crosslinking agents which contain silanes with alkoxy groups and acid amide groups; however, they are also effective, for example, in the case of crosslinking agents which are acetoxysilanes.

The substance which surprisingly has a favorable influence on the adhesion can also be in the form of relatively complicated substances, such as, for example

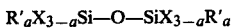

Of all these additives, it is in itself known that they do not have a crosslinking effect by themselves and their use in such systems has thus been avoided.

The cold-curing one-component systems according to the invention usually contain the following constituents:

1. An $\alpha,\omega$-dihydroxypolydiorganosiloxane; the organo group will usually be a methyl or phenyl group. A halogenoalkyl group, such as, for example, a chloromethyl group, an alkenyl group, such as, for example, a vinyl group, or a cycloalkyl group, such as, for example, a cyclohexyl group, can also be present in smaller proportions. The viscosity of these dihydroxypolydiorganosiloxanes is between about 500 and 2,000,000 cP (20° C.), depending on the requirements of the end products. Such homo-, hetero- or co-polymers in general make up about 10% by weight to 90% by weight of the total amount of paste.

2. The crosslinking substance consists of polyfunctional organosilicon compounds with more than two functional groups. This substance must be capable of "crosslinking" the substances mentioned under (1).

In the preparation of the one-component rubber compositions according to the invention by mixing the various substances listed under A to E, the substances under (2), used as crosslinking agents, can be bonded to the ends of the polymer, by splitting off one of the reactive groups, either during the mixing process or during the storage process, or also already in a type of premixing process.

Such organosilicon compounds can be:

(a) of the formula

a = a number from 0 to 2

In this formula, R' can be alkyl, alkenyl or aryl or an appropriately halogenated radical.

X is a reactive group which can react with a silanol group of constituent (1). The reactive group can be, for example, an alkoxy, acyloxy, amino, cycloalkylamino, acid amide or oxime group.

(b) Di-, tri- and poly-siloxanes, formed by partial hydrolysis, of the silanes listed under (a), as shown by the formula for the disiloxane $$R'_a X_{3-a} Si-O-SiX_{3-a} R'_a$$

as (c) in DE-OS (German Published Specification) No. 1,794,197 shows.

3. Fillers of a general nature, used individually or as in most cases as a mixture, for example reinforcing fillers (highly disperse silicic acid, titanium dioxide, carbon black and the like prepared by flame hydrolysis) or fillers such as quartz flour, chalk (naturally occuring and precipitated), powdered plastics and pigments of all types.

4. Auxiliaries of the most diverse nature, such as (a) additives which act as adhesion promoters and are built up in the most diverse manner, for example compounds as described under (2) with aminoalkyl, epoxyalkyl or other reactive alkyl groups, or also compounds as described under (2) in which a is 0 and in which there are different radicals X on one silicon atom.

(b) additives which, for example, act as dryers and/or adhesion promoters, such as, for example, complex titanic acid esters (compare, for example, German Patent Specification No. 1,258,087).

(c) catalysts for accelerating the reaction between the silanol and the crosslinking agent or the crosslinking agent and water, such as metal soaps of the metals from lead to manganese in the electrochemical series of metals, or amino compounds.

(d) solvent additives, such as, for example, toluene or petroleum ether.

(e) additives designated plasticizers, such as, for example, an α,ω-trialkylsiloxypolydiorganosiloxane with a viscosity of about 10 to 1,000,000 cP, polybutenes, benzine hydrocarbons or phosphoric acid esters.

(f) additives which improve the fungistatic activity of the sealing substances.

(g) additives which increase the physical properties of the sealing substances, such as, for example, the stability in hot air, thermal conductivity, electrical conductivity or resistance to chemicals.

The polysiloxane molding compositions are prepared in the customary manner, for example as in the above-mentioned publications.

The present invention will be illustrated in still more detail in the following examples:

EXAMPLE 1

A mixture of 45 parts by weight of an α,ω-dihydroxypolydimethylsiloxane with a viscosity of 50,000 cst at 20° C. and 20 parts by weight of an α,ω-bis-(trimethyl-siloxy)-polydimethylsiloxane with a viscosity of 1,400 cst at 20° C. is initially introduced into the reaction vessel. 5 parts by weight of di-N-methylbenzamidoethoxysilane and 1 part by weight of tetraethoxysilane are added at room temperature and the mixture is stirred for a short time. 20 parts by weight of chalk and 5 parts by weight of finely disperse silicic acid are now added and the mixture is stirred in vacuo until homogeneity is obtained. Finally, 0.02 part by weight of a catalyst (dibutyl-tin diacetate) is added directly, or dissolved in a solvent (for example toluene or dioxane) and is stirred in under a vacuum to form a homogeneous mixture. The composition is now filled into cartridges or tubes and can be stored for at least ½ a year, in the absence of moisture, without the ease of vulcanization or the adhesion during later use being impaired.

The result of the measure according to the invention is that the product adhered to copper, aluminum, steel, iron, PVC and concrete, without a subcoating. A sealing substance which had been prepared without the addition of tetraethoxysilane did not adhere to these substrates. PVC, which is employed in window construction, may be mentioned as an example in the building sector.

EXAMPLE 2

A mixture of 45 parts by weight of the α,ω-dihydroxypolydimethylsiloxane and 20 parts by weight of the α,ω-bis-(trimethyl-siloxy)-polydimethylsiloxane according to Example 1 is initially introduced into the reaction vessel. 5 parts by weight of di-N-methylbenzamidoethoxysilane and 0.5 part by weight of tetrapropoxysilane are added at room temperature and the mixture is stirred for a short time. 20 parts by weight of chalk and 5 parts by weight of finely disperse silicic acid are now added and the mixture is stirred in vacuo until homogeneity is obtained. Finally, 0.02 part by weight of a catalyst (dibutyl-tin diacetate) is added directly, or dissolved in a solvent (for example toluene or dioxane) and is stirred in under a vacuum to form a homogeneous mixture. The composition is now filled into cartridges or tubes and can be stored for at least ½ a year, in the absence of moisture, without the ease of vulcanization or the adhesion during later use being impaired.

The result of the measure according to the invention was that, in contrast to a composition which had not been provided with this additive, this product additionally adhered to aluminum, steel, iron and PVC, without a subcoating and including storage in water for seven days. A considerable improvement in adhesion was also achieved on concrete.

EXAMPLE 3

A mixture of 45 parts by weight of the α,ω-di-hydroxypolydimethylsiloxane and 20 parts by weight of the α,ω-bis-(trimethyl-siloxy)-polydimethylsiloxane according to Example 1 is initially introduced into the reaction vessel. 5 parts by weight of di-N-methylbenzamidoethoxysilane and 1 part by weight of polyethoxysiloxane are added and the mixture is stirred for a short time. 20 parts by weight of chalk and 5 parts by weight of finely disperse silicic acid are now added and the mixture is stirred in vacuo until homogeneity is obtained. Finally, 0.02 part by weight of a catalyst (dibutyl-tin diacetate) is added directly, or dissolved in a solvent (for example toluene or dioxane) and is stirred in under a vacuum to form a homogeneous mixture. The composition is now filled into cartridges or tubes and can be stored for at least ½ a year, in the absence of moisture, without the ease of vulcanization or the adhesion during later use being impaired.

Using this additive, a good adhesion to the following substrates, even after storage in water for 1 week, was achieved according to the invention, likewise without a subcoating: eloxal, aluminum, iron, copper, PVC, polycarbonate and even concrete.

EXAMPLE 4

A mixture of 45 parts by weight of the α,ω-dihydroxypolydimethylsiloxane and 20 parts by weight of the α,ω-bis-(trimethyl-siloxy)-polydimethylsiloxane according to Example 1 is initially introduced into the reaction vessel. 5 parts by weight of di-N-methylbenzamidoethoxysilane and 1 part by weight of ethyltriethoxysilane are added at room temperature and the mixture is stirred for a short time. 20 parts by weight of chalk and 5 parts by weight of finely disperse silicic acid are now added and the mixture is stirred in vacuo until homogeneity is obtained. Finally, 0.02 part by weight of a catalyst (dibutyl-tin diacetate) is added directly, or dissolved in a solvent (for example toluene or dioxane) and is stirred in under a vacuum to form a homogeneous mixture. The composition is now filled into cartridges or tubes and can be stored for at least ½ a year, in the absence of moisture, without the ease of vulcanization or the adhesion during later use being impaired.

The great importance of the additive in respect of the adhesion likewise manifested itself in this example. In this case also, a good adhesion result was achieved on aluminum, zinc, copper and PVC, without a subcoating and with exposure to water.

EXAMPLE 5

A mixture of 45 parts by weight of the α,ω-dihydroxypolydimethylsiloxane and 20 parts by weight of the α,ω-bis-(trimethyl-siloxy)-polydimethylsiloxane according to Example 1 is initially introduced into the reaction vessel. 4 parts by weight of ethyltriacetoxysilane and 1.5 parts by weight of tetraethoxysilane are added at room temperature and the mixture is stirred for a short time. 20 parts by weight of chalk and 5 parts by weight of finely disperse silicic acid are now added and the mixture is stirred in vacuo until homogeneity is obtained. Finally, if appropriate 0.02 part by weight of a catalyst (dibutyl-tin diacetate) is added directly, or dissolved in a solvent (for example toluene or dioxane) and is stirred in under a vacuum to form a homogeneous mixture. The composition is now filled into cartridges or tubes and can be stored for at least ½ a year, in the absence of moisture, without the ease of vulcanization or the adhesion during later use being impaired.

A composition provided with an additive in this manner adheres to the following substrates, without a subcoating and also even after storage in water for 7 days: eloxal, aluminum, iron and polycarbonate. A considerable improvement in the adhesion was also achieved on steel and zinc.

EXAMPLE 6

A mixture of 45 parts by weight of the α,ω-dihydroxypolydimethylsiloxane and 20 parts by weight of the α,ω-bis-(trimethyl-siloxy)-polydimethylsiloxane according to Example 1 is initially introduced into the reaction vessel. 4 parts by weight of ethyltriacetoxysilane and 0.5 part by weight of ethyltriethoxysilane are added at room temperature and the mixture is stirred for a short time. 20 parts by weight of chalk and 5 parts by weight of finely disperse silicic acid are now added and the mixture is stirred in vacuo until homogeneity is obtained. Finally 0.02 part by weight of a catalyst (dibutyl-tin diacetate) is added directly, or dissolved in a solvent (for example toluene or dioxane) and is stirred in under a vacuum to form a homogeneous mixture. The composition is now filled into cartridges or tubes and can be stored for at least ½ a year, in the absence of moisture, without the ease of vulcanization or the adhesion during later use being impaired.

The result of the measure according to the invention was that this sealing substance exhibited a good adhesion to aluminum, zinc, PVC and concrete, even after exposure to water, without a subcoating.

EXAMPLE 7

A mixture of 45 parts by weight of the α,ω-dihydroxypolydimethylsiloxane and 20 parts by weight of the α,ω-bis-(trimethyl-siloxy)-polydimethylsiloxane according to Example 1 is initially introduced into the reaction vessel. 4 parts by weight of ethyltriacetoxysilane and 1.5 parts by weight of tetrapropoxysilane are added at room temperature and the mixture is stirred for a short time. 20 parts by weight of chalk and 5 parts by weight of finely disperse silicic acid are now added and the mixture is stirred in vacuo until homogeneity is obtained. Finally 0.02 part by weight of a catalyst (dibutyl-tin diacetate) is added directly, or dissolved in a solvent (for example toluene or dioxane) and is stirred in under a vacuum to form a homogeneous mixture. The composition is now filled into cartridges or tubes and can be stored for at least ½ a year, in the absence of moisture, without the ease of vulcanization or the adhesion during later use being impaired.

In this example also, a good adhesion to eloxal and PVC could be achieved, even after storage in water, without a subcoating. A further improvement in adhesion was achieved in the case of zinc.

EXAMPLE 8

A mixture of 45 parts by weight of the α,ω-dihydroxypolydimethylsiloxane and 20 parts by weight of the α,ω-bis-(trimethyl-siloxy)-polydimethylsiloxane according to Example 1 is initially introduced into the reaction vessel. 5 parts by weight of di-N-methylbenzamidoethoxysilane and 9 parts by weight of an α,ω-[bis-triethoxysilylethyl]-dimethyldisiloxane are added at room temperature and the mixture is stirred for a short time. 20 parts by weight of chalk and 5 parts by weight of finely disperse silicic acid are now added and the mixture is stirred in vacuo until homogeneity is obtained. Finally, if appropriate, 0.02 part by weight of a catalyst (dibutyl-tin diacetate) are added directly, or dissolved in a solvent (for example toluene or dioxane) and are stirred in under a vacuum to form a homogeneous mixture. The composition is now filled into cartridges or tubes and can be stored for at least ½ a year, in the absence of moisture, without the ease of vulcanization or the adhesion during later use being impaired.

The result of the measure according to the invention was that, compared with a product without this additive, the product exhibited a considerable improvement in adhesion to a number of metals (aluminum, copper and steel), plastics (various types of PVC) and to concrete, even after storage in water for one week, without a subcoating.

EXAMPLE 9

A mixture of 60 parts by weight of the α,ω-dihydroxypolydimethylsiloxane and 24 parts by weight of the α,ω-bis-(trimethyl-siloxy)-polydimethylsiloxane according to Example 1 is initially introduced into the reaction vessel. 5 parts by weight of tri-n-butylaminosilane and 0.1 part by weight of methyltriethoxysilane are added at room temperature and the mixture is stirred for a short time. 10 parts by weight of finely disperse silicic acid are now added and the mixture is stirred in vacuo until homogeneity is obtained. Finally, 0.08 part by weight of a catalyst (dibutyl-tin diacetate) is added directly, or dissolved in a solvent (for example toluene or dioxane) and is stirred in under vacuum to form a homogeneous mixture. The composition is now filled into cartridges or tubes and can be stored for at least ½ a year, in the absence of moisture, without the ease of vulcanization or the adhesion during later use being impaired.

An improvement in adhesion without a subcoating was achieved on the following substrates: aluminum, eloxal, iron, steel and polycarbonate (even on storage in water).

EXAMPLE 10

A mixture of 60 parts by weight of the α,ω-dihydroxypolydimethylsiloxane and 24 parts by weight of the α,ω-bis-(trimethyl-siloxy)-polydimethylsiloxane according to Example 1 is initially introduced into the reaction vessel. 5 parts by weight of methylethoxydipropionamidosilane and 1 part by weight of polyethoxysiloxane are added at room temperature and the mixture is stirred for a short time. 10 parts by weight of finely disperse silicic acid are now added and the mixture is stirred in vacuo until homogeneity is obtained. Finally, 0.08 part by weight of a catalyst (dibutyl-tin diacetate) is added directly, or dissolved in a solvent (for example toluene or dioxane) and is stirred in under vacuum to form a homogeneous mixture. The composition is now filled into cartridges or tubes and can be stored for at least ½ a year, in the absence of moisture, without the ease of vulcanization or the adhesion during later use being impaired.

The result of the measure according to the invention was that adhesion without a subcoating could only ever be achieved with the additives indicated.

By contrast, without the instant additive the same degree of adhesion could be achieved only by first applying a subcoat.

In general, unless otherwise stated as employed hereinabove the alkyl, alkoxy and alkenyl radicals preferably have up to about 4 carbon atoms and the aryl radical is preferably phenyl. The acyl moiety of the acyloxy, amide and oxime radicals preferably are lower alkanoyl with up to 4 carbon atoms. The preferred cycloalkyls are cyclopentyl and cyclohexyl.

It will be appreciated that the instant specification and examples are set forth by way of illustration and not limitation, and that various modifications and changes may be made without departing from the spirit and scope of the present invention.

What is claimed is:

1. In a polysiloxane molding composition which in the presence of water crosslinks to an elastomer and which comprises
   (A) an α,ω-dihydroxyorganopolysiloxane with a viscosity of about 500 to 2,000,000 cP,
   (B) a crosslinking agent, and
   (C) a reinforcing filler,
the improvement which comprises including therein in about 0.1 to 10% by weight a silicon compound containing at least 3 alkoxy groups and employing as the crosslinking agent an alkoxybenzamidosilane or an alkoxypropionamidosilane whereby the elastomer ultimately produced exhibits improved direct adhesion to various substances.

2. A composition according to claim 1, wherein the silicon compound is of the formula $$R_nSi(Alkoxy)_{4-n}$$

in which
R is alkyl with 1 to 10 carbon atoms,
Alkoxy has 1 to 4 carbon atoms, and
n is 0 or 1.

3. A composition according to claim 1, which further contains a curing catalyst.

* * * * *